US 6,415,281 B1

(12) United States Patent
Anderson (10) Patent No.: US 6,415,281 B1
(45) Date of Patent: *Jul. 2, 2002

(54) ARRANGING RECORDS IN A SEARCH RESULT TO BE PROVIDED IN RESPONSE TO A DATA INQUIRY OF A DATABASE

(75) Inventor: Dewey Charles Anderson, Roswell, GA (US)

(73) Assignee: BellSouth Corporation, Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/922,620

(22) Filed: Sep. 3, 1997

(51) Int. Cl.[7] .............................................. G06F 17/30
(52) U.S. Cl. ........................ 707/3; 707/1; 707/2; 707/5; 707/7; 707/104
(58) Field of Search ................................ 707/3, 104, 2, 707/1, 5, 7, 104.1

(56) References Cited

U.S. PATENT DOCUMENTS

| | | | | |
|---|---|---|---|---|
| 4,611,310 A | * | 9/1986 | Durbin | 365/230.1 |
| 4,972,349 A | * | 11/1990 | Kleinberger | 707/1 |
| 5,206,949 A | * | 4/1993 | Cochran et al. | 707/4 |
| 5,542,089 A | * | 7/1996 | Lindsay et al. | 707/2 |
| 5,636,346 A | * | 6/1997 | Saxe | 395/201 |
| 5,642,502 A | * | 6/1997 | Driscoll | 707/5 |
| 5,659,742 A | * | 8/1997 | Beattie et al. | 707/104 |

(List continued on next page.)

FOREIGN PATENT DOCUMENTS

| | | |
|---|---|---|
| EP | 0 523 700 A2 | 7/1992 |
| WO | WO 95/27254 | 10/1995 |
| WO | WO 97/22066 | 6/1997 |

OTHER PUBLICATIONS

Gallagher, Katherine and Parsons, Jeffery, "A Framework for Targeting Banner Advertising on the Internet," IEEE, "System Sciences, 1997, Proceedings of the Thirtieth HWaii International Conferenc," vol. 4, pp. 265–273, Jan. 7, 1997.*

*Primary Examiner*—Hosain T. Alam
*Assistant Examiner*—Ella Colbert
(74) *Attorney, Agent, or Firm*—Kilpatrick Stockton LLP (57) ABSTRACT

Systems and methods for arranging records in search results to be provided in response to a data inquiry of a database. After search results including records are received, a determination is made with respect to the order of the records in the search results. This determination may be based on various factors such as the destination of the search results, the preferred status of certain records over other records, a marketing determination with respect to the records, a frequency determination with respect to the number of times that a record or records may have already been provided in response to data inquiries, a weighting factor determination or a combination of one or more of these factors. In response to the determination of the order of the records in the search results, the records then are arranged into ordered records based on the determination. This order may be an alphabetical order, a preferred order based on the preferred status of certain records over other records, a least frequent first order, a highest weighting factor first order, or a combination of these orders. The search results with the records arranged into ordered records are then provided in response to the data inquiry.

2 Claims, 5 Drawing Sheets

U.S. PATENT DOCUMENTS

| | | | |
|---|---|---|---|
| 5,721,897 A | * 2/1998 | Rubinstein | 707/2 |
| 5,727,201 A | * 3/1998 | Burke | 707/10 |
| 5,742,816 A | * 4/1998 | Barr et al. | 707/104 |
| 5,768,581 A | * 6/1998 | Cochran | 707/104 |
| 5,794,210 A | * 8/1998 | Goldhaber et al. | 705/14 |
| 5,850,433 A | * 12/1998 | Rondeau | 379/201 |
| 5,852,826 A | * 12/1998 | Graunke et al. | 707/7 |
| 5,870,740 A | * 2/1999 | Rose et al. | 707/5 |
| 5,878,410 A | * 3/1999 | Zbikowski et al. | 707/2 |
| 5,895,470 A | * 4/1999 | Pirolli et al. | 707/102 |
| 5,948,061 A | * 9/1999 | Merriman et al. | 709/219 |
| 5,974,398 A | * 10/1999 | Hanson et al. | 705/14 |
| 5,978,773 A | * 11/1999 | Hudetz et al. | 705/23 |
| 6,026,371 A | * 2/2000 | Beck et al. | 705/14 |

* cited by examiner

ARRANGING RECORDS IN A SEARCH RESULT TO BE PROVIDED IN RESPONSE TO A DATA INQUIRY OF A DATABASE

TECHNICAL FIELD

This invention relates generally to systems and methods for the provision of information as search results in response to a data inquiry. More particularly, this invention relates to systems and methods for arranging the records of search results into ordered records to be included in the search results provided in response to a data inquiry of a database.

BACKGROUND

Let's change the rules of baseball. Let's provide that the players on each of the teams must be played at random. In other words, let's eliminate a baseball manager's right to decide the line-up of his or her team.

What general effect would this rule change have on a game? It would turn baseball even further from a game of strategy and tactics to a game of chance. What effect would this rule change have on the manager? By eliminating the manager's right to decide the line-up of his or her team, the manager is robbed of one category of his or her tactical inputs into the game. The manager becomes even less of a master or mistress with respect to the outcome of the game. What effect would this rule change have on the team owner? By eliminating the manager's right to decide the line-up of his or her team, the team owner does not have to consider the manager's skill in setting a line-up when hiring or firing a manager. But like the manager, the team owner is faced with even less certainty of a winning ball club. What effect would this rule change have on the baseball fan? By eliminating the manager's right to decide the line-up of his or her team, the fan does not know who is coming to the plate until the last minute. At times, a particular player's appearance at the plate may be a pleasant, welcome and hoped for surprise. But at others, another player's appearance at the plate may foreshadow an unhappy result in the ballgame. Like the manager and the team owner, under this new rule, the baseball fan arrives at the ball park with a lot less certainty regarding the pending outcome of the ballgame.

Our disturbance of the rules of baseball is sure to have left many readers uncomfortable. Like the baseball manager, we like to set the line-up of our team. Many of us prefer to have tactical and strategic input into events that take place in our lives. By this input, we may control or at least have some control of these events so as to maximize the advantages. For example, we may arrange the tasks of our workday so as to more efficiently or economically derive advantages from the workday. But in many areas, the line-up is not set and information or other occurrences are thrown at us at random.

An area in which information is often provided at random to the user is in the area of information retrieval. For example, assume that a user is using a computer system to search a database for certain information. The user formulates a data inquiry and transmits it to the system. After the system conducts the search of the database, the information that was found during the search is provided as search results to the user in response to the data inquiry. Typically, search results include more than one piece of information which we refer to herein as a record. Thus, the user is typically provided with more than one record in the search results.

Generally, the records in search results are provided in random order to the user. This oxymoron, "random order", denotes that each record is provided to the user without regard to the other records in the search results. Further, random order also may denote that each record is provided to the user without regard to factors that may relate to the user, the data inquiry, the database, the other records in the search results as well as without regard to other factors. In some cases, the records of search results may be provided in an alphabetical order, which is considered generally to be a sub-set of random order. Alphabetical order is considered to be such a sub-set of random order because alphabetical order is generally not based on some relationship factor linking the records. Rather, alphabetical order or an alphabetical relationship amongst the records is based on the happenstance of use of a term and a particular letter of the alphabet associated with that term. The term(s) used to alphabetize the records in the search results may be arbitrarily and randomly chosen. Thus, the term "random order" is used herein to include alphabetical order of records in search results. To return to our baseball analogy, when the records of search results are provided in random order, it is like playing the members of a baseball team at random. This random order may include playing the members of the baseball team in alphabetical order based on their first names, last names, nicknames, hometowns, etc.

As noted, the records in search results may be provided in random order by the service provider of the search results. In the event of such provision of records in random order, the search provider is like the baseball manager under the new rules of baseball. The search provider loses tactical and strategic input into the "game" of providing search results. The service provider lacks control that otherwise could be used to provide search results in some advantageous tactical or strategic manner.

This lack of control may affect the service provider's ability to retain or attract clients. A client is distinguished herein from a user. A client of a service provider generally is defined herein to be an entity that supplies the service provider with information that may be used in the service provider's database. A client may pay or otherwise remunerate the service provider to use the client's information in the database, and in particular, in the search results that are provided to users making database inquiries. For example, the service provider may maintain and provide search results from a database such as a classified advertising database. In this example, a client may be an entity that provides information for use in the classified advertising database such as an advertisement. This advertisement may become a record in the classified advertising database.

If the service provider lacks control with respect to the order of records in search results, then the client's information may not make its way into advantageous positions in the search results. Alternatively, the client's information may not make its way often enough to the client's satisfaction into advantageous positions in the search results provided to users by the service provider. The client then is less certain with such a service provider that the client's information will make it into a good position in the "line-up" of records in the search results. In a sense, the client may be likened to the team owner (of information) in our baseball analogy. The client as the team owner may be very interested in the talents of the service provider as the manager in setting the line-up of records of the search results. If the service provider does not have any such talents, or if they are very limited, then the client as the team manager is less certain of a winning line-up that includes the client's information being provided to users. Similarly, if we refer to the classified advertising database example, if the service provider lacks control with respect to the order of advertisements that are provided in search results to a user, then the advertiser's information may not make its way into advantageous positions in the search results. Or, the advertiser's information may not make its way often enough to the advertiser's satisfaction into advantageous position in the search results. The advertiser then may be less willing to advertise with the service provider of the classified advertising directory, or at least be less willing to pay premiums for such advertising services.

The lack of control in providing search results also may affect the service provider's ability to retain or attract users. As noted above, a user is distinguished herein from a client. A user of a service provider generally is defined herein to be the person or entity that makes a data inquiry for information of the service provider. Like a client, the user may pay or otherwise remunerate the service provider. But in the case of the user, the remuneration typically is for the service of providing information to the user in the form of records in search results in response to a data inquiry. If the service provider lacks control with respect to the order of records in search results, then the information may be provided to the user in an order that is difficult to use. The user is not provided with a good "line-up" of records in the search results. In a sense, the user may be likened to the fan in our baseball analogy. The user as the fan may be very interested in the talents of the service provider as the manager in setting the line-up of records of the search results. If the service provider does not have any such talents, or if they are very limited, then the user as a fan is less certain of a winning line-up of records in the search results. If the service provider cannot set a line-up of records in search results, then the user as the fan does not know who or what is coming to the plate until the record arrives. At times, a particular record's appearance at the plate may be a pleasant, welcome and hoped for surprise. Or, like in the baseball analogy, another record's appearance may foreshadow an unhappy or unusable result. Like the service provider as the manager and the client as the team owner, when there is random order to records in search results, then the user as the baseball fan has a lot less certainty regarding the outcome in a ballgame of information retrieval.

In conclusion, there is a need in the field of information retrieval to provide the records in search results other than in random order so as to retain advantageous tactical and strategic input with respect to the provision of such search results in response to data inquiries.

SUMMARY

Generally stated, the present invention provides several different systems and methods for arranging records in search results into ordered records to be included in the search results provided in response to a data inquiry of a database. Advantageously, the records in search results are arranged into ordered records so that the service provider may retain tactical and strategic input with respect to the provision of such search results in response to data inquiries. By this invention, the service provider may benefit by being able to provide additional services or features with respect to information retrieval. These additional services or features may afford the service provider with competitive advantages over other service providers of information. In particular, these additional services or features may serve to retain or attract clients as well as users to the service provider.

Further, these additional services or features may be especially attractive to clients and users for several reasons. A service that provides ordered records in search results may be attractive to a client because the client may benefit by having its information appear as records more often or more advantageously positioned in the search results that are provided to users. The client may take advantage of one or more of the several different systems and methods for ordered records in search results so that the client's information is used or placed for maximum effect with respect to users. In addition, a service that provides ordered records in search results may be attractive to a user because the user may benefit by having records delivered in search results in a more usable or otherwise more advantageous manner.

Stated generally, the present invention provides several different systems and methods for arranging records in search results to be provided in response to a data inquiry of a database. After search results including records are received, a determination is made with respect to the order of the records in the search results. This determination may be based on one or a combination of factors such as on the destination of the search results, on the preferred status of certain records over other records, on a marketing determination with respect to the records, on a frequency determination with respect to the number of times that a record or records may have already been provided in response to data inquiries, or on a weighting factor determination. In response to the determination of the order of the records in the search results, the records then are arranged into ordered records based on the determination. The order of these ordered records may be an alphabetical order, a preferred order based on the preferred status of certain records over other records, a least frequent first (LFF) order, or a highest weighting factor first (HWFF) order or a combination of these orders. The search results with the records arranged as ordered records are then provided in response to the data inquiry.

Stated less generally, the present invention provides a system and a method for arranging records in search results with the arrangement being based on the destination of the search results. Pursuant to the exemplary system and method, a destination determination is made for the search results. In response to the destination determination, the records of the search results are arranged into a destination order based on the destination determination. The destination order may be an alphabetical order. Alternatively, the destination order may be a preferred order of listing a preferred record before other records in the search results. The search results in the destination order are then provided in response to the data inquiry of the database. As another alternative, the destination order may be a least frequent first (LFF) order. The LFF order provides that a least frequent (LF) record is listed before other records in the search results. The LF record is a record of the search results that has been included in other search results less often than any other record of the search results. In response to the destination determination, a determination then is made of the LF record of the search results. The records of the search results then are arranged into the LFF order in the search results. The records of the search results in the LFF order are then provided in response to the data inquiry of the database. As yet another alternative, the destination order may be a weighting factor determination then is made as to whether the records of the search results are to be provided in a highest weighting factor first (HWFF) order. The HWFF order provides that a highest weighting factor (HWF) record is listed before other records in the search results. The HWF record may be a record of the search results that has a higher weighting factor than any other record of the search results. In response to the weighting factor determination, a determination is made of the HWF record of the search results.

The records of the search results then are arranged into the HWFF order, the records in the HWFF order are provided in response to the data inquiry of the database.

Stated more particularly, the present invention provides a system and a method for arranging records in search results with the arrangement being based on a marketing determination with respect to the search results or other factors. Pursuant to the exemplary system and method, a marketing determination is made with respect to the order of the records in the search results. This marketing determination may be that the records be listed in a preferred order with a preferred record being listed before other records in the search results. In response to the marketing determination, a determination is made as to whether a record of the search results is a preferred record. If so, then the records of the search results are arranged into the preferred order in the search results. The search results in the preferred order are then provided in response to the data inquiry of the database.

Also, stated more particularly, the present invention provides a computer-readable medium on which is stored a computer program for arranging records in search results to be provided in response to a data inquiry of a database. The computer program includes instructions, which when executed by a computer, perform the steps of receiving search results including records and making a determination regarding an order of the records in the search results. The determination may be based on at least one of the following: the destination of the search results, the preferred status of certain records over other records, a marketing determination with respect to the records, a frequency determination with respect to the number of times that a record may have already been provided in response to data inquiries, or a weighting factor. In response to the determination, the instructions perform the step of arranging the records of the search results as ordered records. The ordered records may be the records arranged into at least one of the following: an alphabetical order, a preferred order based on the preferred status of a record over the other records, a least frequent first order, or a highest weighting factor first order. Finally, the instructions then perform the step of providing the search results including the ordered records in response to the data inquiry of the database.

In conclusion, it is an object of the present invention with respect to the field of information retrieval to provide systems and methods for arranging the records of search results into ordered records to be included in the search results in response to a data inquiry of a database.

It is also an object of the present invention to provide systems and methods for arranging the records of search results into ordered records based on characteristics or factors associated with the destination of the search results, on the records of the search results, on the clients or entities supplying the information, on the clients or entities receiving the search results, and on other characteristics and factors.

It is a further object of the present invention to provide records in search results other than in random order so as to retain advantageous tactical and strategic input with respect to the provision of such search results in response to data inquiries.

The exemplary systems, methods and embodiments of the present invention are described herein in the context of arranging records in search results obtained from a database such as a database of classified advertising information. Nonetheless, the present invention may be applied to a broad variety of other systems and methods, and in particular, may be applied to a broad variety of other information retrieval systems, search engines, and databases.

The present invention and its objects and advantages, those described above and otherwise, may be further appreciated from a review of the following detailed description, drawings and claims.

BRIEF DESCRIPTION OF THE DRAWINGS

FIG. 5, consisting of FIGS. 5A–5D, illustrate alternative steps of exemplary methods of the present invention.

DETAILED DESCRIPTION

Introduction

This detailed description provides information with regard to several different exemplary systems and methods for arranging records in search results into ordered records to be provided in response to a data inquiry of a database. The exemplary embodiments and methods described herein are intended in all respects to be illustrative rather than restrictive. Alternative embodiments and methods will be apparent to those skilled in the art. The present invention is described in this detailed description first by a general description of exemplary systems and methods of the present invention and then by a general description of the types of computer systems and software modules that may embody or be used in connection with the present invention.

Figure 1:
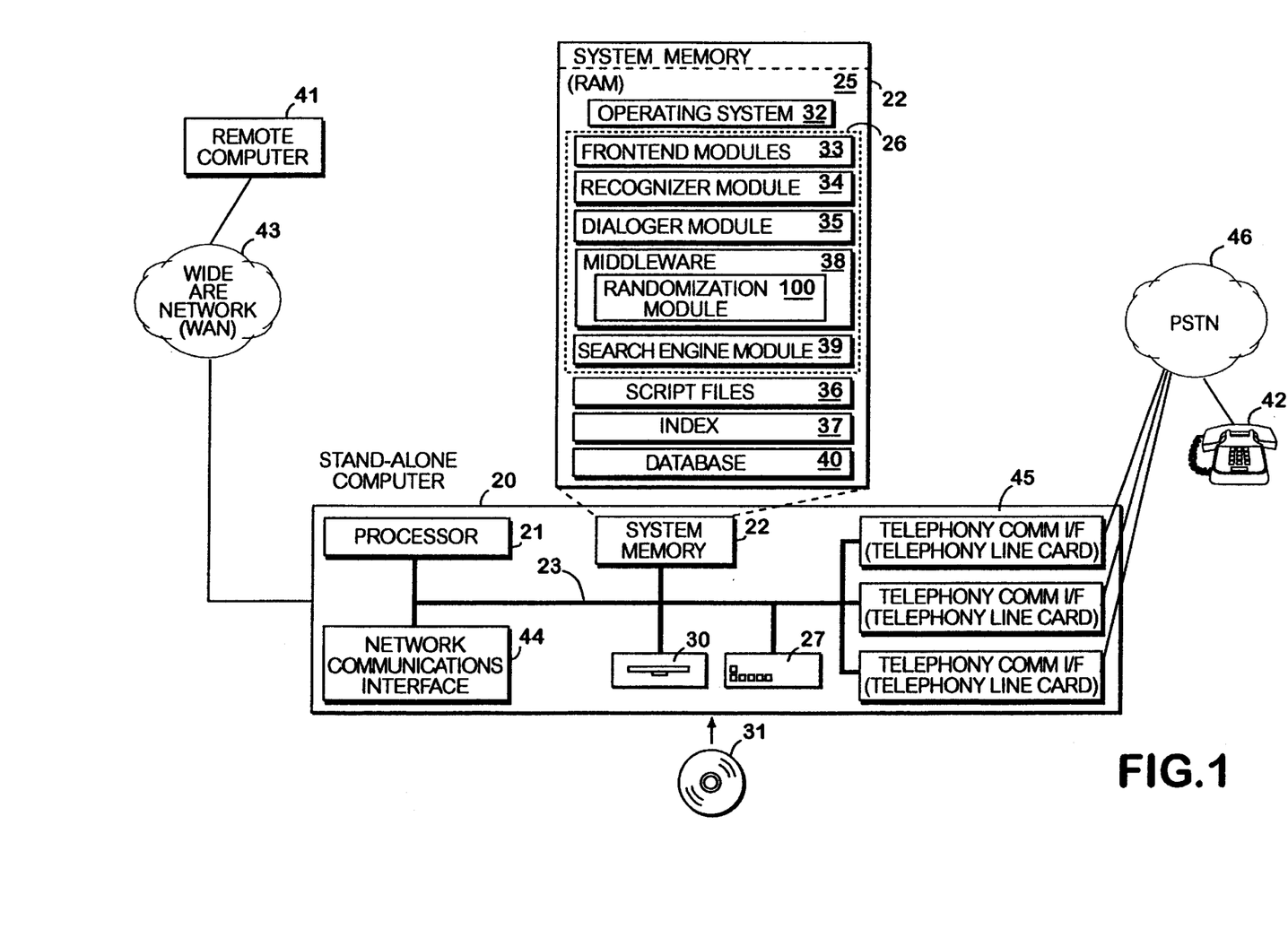
FIG. 1 is a block diagram of a computer system that provides an exemplary operating environment for embodiments of the present invention.

Following these general descriptions, a more detailed description of a stand-alone computer system as an exemplary operating environment is provided in connection with FIG. 1. Then a more detailed description of a distributed computer system as an exemplary operating environment is provided in connection with FIG. 2. After the descriptions of these computer systems, a description of illustrative software components and their operative interrelationships in the exemplary embodiments is presented in connection with FIG. 3. A flow diagram illustrating steps of an exemplary method of the present invention is described in connection with FIG. 4. Finally, in FIG. 5, alternative steps of exemplary methods of the present invention are described.

A General Description of Exemplary Systems and Methods of the Present Invention

Stated generally, the present invention provides methods for arranging records in search results to be provided in response to a data inquiry of a database. After search results including records are received, a determination is made with respect to the order of the records in the search results. This determination may be based on one or a combination of factors such as on the destination of the search results, on the preferred status of certain records over other records, on a marketing determination with respect to the records, on a frequency determination with respect to the number of times that a record or records may have already been provided in response to data inquiries, or on a weighting factor determination. In response to the determination of the order of the records in the search results, the records then are arranged into ordered records based on the determination. The order of these ordered records may be an alphabetical order, a preferred order based on the preferred status of certain records over other records, a least frequent first order, or a highest weighting factor first order or a combination of these orders. The search results with the records arranged as ordered records are then provided in response to the data inquiry.

A General Description of the Types of Computer Systems and Program Modules that May Embody or Be Used in Connection with the Present Invention.

The preferred embodiment of the present invention is embodied as part of a group of program modules that operate as an interactive information retrieval system (hereinafter the "IR system") used with a multi-tasking computer or computer system. Generally, program modules include routines, programs, records, data structures, steps, etc. that perform particular tasks or implement particular abstract data types. The present invention also may be implemented in conjunction with objects and other program modules for other types of computers or computer systems.

The present invention may be embodied within or carried out by a stand-alone computer or computer system or a distributed computer system. In a distributed computing environment, program modules may be physically located in different local or remote memory storage devices. Execution of the program modules may occur locally in a stand-alone manner or remotely in a client/server manner. Examples of such distributed computing environments include local area networks, enterprise-wide computer networks, and the global Internet. Examples of such computer environments are provided in the following commonly-assigned patent applications: A System and Methods for Dynamically Processing an Index to Dynamically Create a Set of Questions, Ser. No. 08/844,751, filed on Apr. 21, 1997, and A System and Methods for Routing Information within an Adaptive Routing Architecture of an Information Retrieval System, Ser. No. 08/866,228, filed on May 30, 1997. Both of these referenced patent applications are incorporated herein by reference. The present invention also may be practiced with other system configurations, including hand-held devices, multiprocessor systems, microprocessor-based or programmable consumer electronics, minicomputers, mainframe computers, and the like. Other methods and system implementations will occur to those skilled in the art.

As noted, the preferred embodiment of the present invention is embodied as part of a group of program modules that operate as an interactive IR system. Briefly described, the IR system allows a user (via voice or digital communication signals) to make a request for information. This request for information is referred to herein as a data inquiry, or also as a search request or search query. The information may be stored in one or more databases associated with the IR system. Based upon the data inquiry, the IR system may obtain search results, which also may be referred to as a set of search results. These search results may be considered to be the information that is obtained during the search of the relevant databases. Typically, a set of search results includes one or more records. Each record may be considered to be an answer to the data inquiry.

The description of the present invention is presented in terms of systems, methods, processes and symbolic representations of operations by conventional computer elements such as a processor, memory storage devices, data communications networks, and communication interfaces such as telephone line cards or network interface cards. These systems, methods, processes and symbolic representations of operations may include the manipulation of signals by a processor and the maintenance of these signals within data sets and data structures. These data sets and data structures are resident in one or more memory storage devices. A data set is commonly understood to be collection of related information that may exist as separate elements, but that may be manipulated as a unit. A data structure is commonly understood to be an organizational scheme that encapsulates data in order to support data interpretations and data operations. The data structure imposes an organization upon the collection of data stored within a memory storage device and represents specific electrical or magnetic elements. A data structure may be created from the separate elements or objects of a data set or another data structure. A database may be a data set or a data structure depending on the particular implementation. These symbolic representations are used by those skilled in the art of computer programming and computer construction to convey teachings and discoveries to others skilled in the art.

A process is generally considered to be a sequence of computer-executed steps leading to a desired result. These steps may require physical manipulations of physical quantities. Commonly, these quantities take the form of electrical, magnetic, or optical signals that may be stored, transferred, combined, or otherwise manipulated. These representations of signals are generally referred to as bits, bytes, words, information, an index, terms, index categories, domains, data, objects, records, images, files or the like. These and similar terms are associated with appropriate physical quantities for computer operations, and are applied as conventional labels to physical quantities that exist within and during operation of the computer or computer system.

Manipulations with respect to the computer or computer system are often referenced with terms such as providing, arranging, searching, transmitting, receiving, prompting, determining, identifying, storing, selecting, deleting, etc. These terms are often associated with the manual operations that may be performed by a user in carrying out these manipulations with the computer or computer system. But these manipulations are machine operations performed in conjunction with various inputs provided by the user that interacts with the computer, computer system or other device.

The systems, methods, processes, symbolic representations, processes and the like that are described herein are unrelated to and not limited to particular computers, computer systems, elements thereof, networks, or computer or communication architectures. To the contrary, various types of general purpose machines may be used with program modules, programs or steps constructed in accordance with the teachings described herein. It may be advantageous to devote a specialized apparatus to perform the steps described herein by way of dedicated computer systems in a specific network architecture with hard-wired logic or programs stored in nonvolatile memory, such as read only memory (ROM).

Exemplary Operating Environment—Stand-alone Computer System—FIG. 1

Referring now to FIG. 1, an exemplary stand-alone computer system for implementing the present invention includes a conventional stand-alone computer 20, including a processor 21, a system memory 22, and a system bus 23 that couples the system memory 22 to the processor 21. The system memory 22 includes random access memory (RAM) 25. The stand-alone computer 20 further includes a hard disk drive 27 and an optical disk drive 30 (e.g., a disk drive that reads from a CD-ROM disk 31 or reads from or writes to other optical media). The hard disk drive 27 and the optical disk drive 30 are connected to the system bus 23. The drives and their associated computer-readable media provide non-volatile storage for the stand-alone computer 20. Although the description of computer-readable media above includes the hard disk drive 27 and the optical disk 31, such as a CD, other types of media which are readable by a computer, such as removable magnetic disks, magnetic cassettes, flash memory cards, digital video disks and tapes, Bernoulli cartridges, and the like, may also be used in each of the exemplary operating environments described with regard to FIG. 1 and FIG. 2.

A number of program modules may be stored in the drives 27, 30 and RAM 25, including an operating system 32 and a variety of other software program modules. In an embodiment of the present invention, an example of such software modules is a group of software modules collectively referred to as the interactive information retrieval system modules 26 (IR system modules). The IR system modules 26 preferably include the following software modules:

one or more frontend modules 33, a recognizer module 34, a dialoger module 35 (which interacts with script files 36 and an index 37 and dispatches search requests to the search engine 39), a middleware layer of software 38 including a randomization module 100, and a search engine 39 (which interacts with a database 40 stored on the hard disk drive 27 or on the optical disk 31 in the optical disk drive 30).

When any of the IR system modules 26 are used, the processor 21 may bring only a portion of the module into memory at a time due to the size of the module.

The operating system 32 provides the basic interface between the computer's hardware and software resources, the user, and the IR system modules 26. In the exemplary operating environments described with regard to FIGS. 1 and 2, the operating system 32 is preferably a real-time operating system, such as the SOLARIS operating system, produced by SunSoft, a division of Sun Microsystems. A real-time operating system is preferred in order to provide adequate response when searching and interacting with multiple users. The SOLARIS operating system has a multithreaded, symmetric multiprocessing, real-time UNIX kernel. Those skilled in the art will appreciate the need for real-time, multithreaded performance in information retrieval applications in order to support an adequate level of transactional performance. Additional information regarding the SOLARIS operating system is available by reference to system manuals published by Sun Microsystems and other widely available literature on UNIX operating systems.

As with most conventional computer systems, a user may enter commands and information into the stand-alone computer 20 through a keyboard (not shown) and an input or pointing device, such as a mouse (not shown). Other input devices (not shown) may include a microphone, a joystick, a game pad, a satellite dish, a scanner, or the like. These and other input devices are often connected to the processor 21 through a serial port interface (not shown), such as a game port or a universal serial bus (USB), connected to the system bus 23. A monitor (not shown) or other type of display device can also be connected to the system bus 23. In addition to the monitor, computers such as the stand-alone computer 20 typically include other peripheral output devices (not shown), such as speakers, printers, and backup devices.

In the preferred embodiment, a user typically interacts with the stand-alone computer 20 when the stand-alone computer 20 functions in a server capacity. In this capacity, the stand-alone computer 20 can service a remote programmable device, such as a remote computer 41, or a telephone device, such as a conventional telephone 42, each of which is logically connected to the stand-alone computer 20.

The remote computer 41 may be a server, a router, a peer device, or other common network node. Typically, the remote computer 41 includes many or all of the elements described relative to the stand-alone computer 20. The logical connection between the remote computer 41 and the stand-alone computer 20 depicted in FIG. 1 is a data communications network, such as a wide area network (WAN) 43. Other examples of data communications networks include enterprise-wide computer networks, intranets, or the global Internet. A communications interface, such as a network communications interface 44 in the stand-alone computer 20, links the WAN 43 and the stand-alone computer 20. However, the logical connections to the stand-alone computer 20 may also be a local area network (LAN) (not shown) that is commonplace in offices. Typically, a user of the remote computer 41 interacts with the stand-alone computer 20 via such logical connections in order to search the database 40 for information and to respond to scripted questions posed by the stand-alone computer 20.

The exemplary database 40 contains a plurality of records (not illustrated). Each record contains specific information. By way of explanation, reference is made to a database that includes records of classified advertising information. An example of the type of specific information that may be stored in the record of such a database is information about a restaurant. This restaurant information in a record may include the kind of cuisine served by the restaurant, the location of the restaurant, the hours of the restaurant's operation, payments methods accepted by the restaurant, and any offered amenities. The database 40 may include flat-file records, but the database also may include or be a data structure including records that may be relational tables. Further, each record may include one or more fields or tables.

A telephony communication interface 45 (also known as a telephony line card) connected to a conventional public switched telephone network 46 (PSTN) provides the logical connection between the stand-alone computer 20 and the conventional telephone 42. In this manner, the user may interact with the stand-alone computer 20 with voice responses via a conventional telephone 42 or other telephonic device. In the preferred embodiment, the telephony communication interface 45 is a Model Antares 2000 telephone line interface card manufactured by Dialogic Corporation of Parsippany, N.J. Both the network communications interface 44 and the telephony communication interface 45 are generally referred to as "communication interfaces" because the stand-alone computer 20 provides the service of processing data inquiries through both of these interfaces. The network and telephone connections shown are exemplary and other means of establishing a communications link between the stand-alone computer 20 and the remote computer 41 or conventional telephone 42 may be used.

Figure 2:
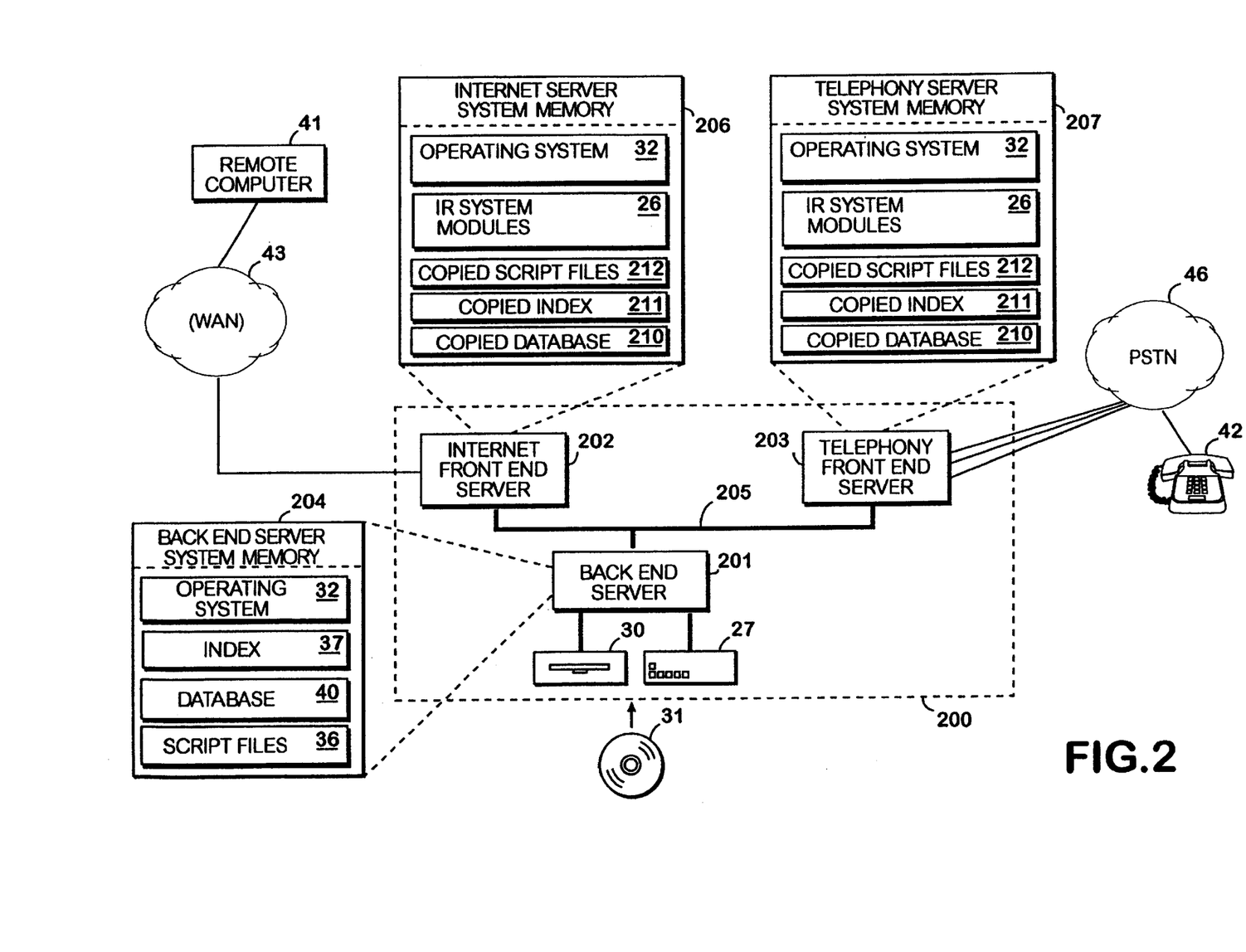
FIG. 2 is a block diagram of a distributed computer system that provides an exemplary operating environment for an embodiment of the present invention.

Exemplary Operating Environment—Distributed Computer System—FIG. 2

In FIG. 2, a block diagram of a distributed computer system is illustrated that also provides an exemplary operating environment for an embodiment of the present invention. Referring now to FIGS. 1 and 2, the distributed computer system 200 includes a backend server 201 and one or more front end servers, such as an Internet frontend server 202 or a telephony front end server 203.

In this distributed computing environment, the functions performed by the stand-alone computer 20 can be broken apart and allocated amongst each of the servers 201–203. In this manner, resources can be dedicated in order to more efficiently interact with users and search the database (via the Internet front end server 202 and the telephony front end server 203) and to centralize file storage and maintenance of certain data files (via the backend server 201). The ability to break apart and allocate the functions amongst different servers is advantageous because users can rely on dedicated hardware and software for enhanced transactional processing.

Furthermore, the manner of providing the database 40, the index 37, and the script files 36 is simplified by providing access to these software modules from a central location. Only the software modules in the central location need be updated. From the central location, each frontend server 202–203 can then access and copy the most up-to-date software modules used when processing data inquiries. Thus, centrally maintaining these files is preferred over individually updating these software modules in each server 202–203.

The backend server 201 is similar to the stand-alone computer 20 from a hardware perspective. The backend server 201 has a system memory 204 and memory storage devices (such as the hard disk drive 27 and the optical disk drive 30) which are used to maintain the database 40, the index 37, and the script files 36. By maintaining the database 40, the index 37, and the script files 36 in this central location, they are easier to consistently maintain and update. The backend server 201 provides each of the frontend servers 202–203 access to these files over a conventional data network 205 (LAN, WAN, etc.) that electronically connects the backend server 201 to the frontend servers 202–203. The backend server 201 is preferably a file server for centrally maintaining and updating these files. But it is contemplated that the backend server system memory 204 may also include the IR system modules 26 in order to operate similarly to the stand-alone computer 20. In this manner, the backend server 201 may function as a peak-time frontend server when needed to assist one of the frontend computers 202–203.

Each of the frontend servers are similar to the stand-alone computer 20 from a hardware perspective and from a software perspective. The Internet frontend server 202 preferably includes each feature of the stand-alone computer 20, but does not need any telephony communication interfaces 45. The network communication interface 44 on the Internet frontend server 202 is used to communicate with the backend server 201. The telephony frontend server 203 essentially has the same elements as the stand-alone computer 20. Similar to the Internet frontend server 202, the network communication interface 44 on the telephony frontend server 203 is used to communicate with the backend server 201.

Essentially, the frontend servers 202–203 interact with users and process user's requests for information. In one situation, the remote computer 41 is configured as a remote device manipulated by the user via data entry. The remote computer 41 interacts with the Internet frontend server 202 via the WAN 43 and a service communication interface (preferably similar to the network communication interface 44) within the Internet frontend server 202. In this situation, the remote computer 41 preferably communicates with the Internet frontend server 202 using a conventional hypertext transfer protocol (HTTP). Thus, the Internet frontend server 202 preferably functions as a Web server providing the remote computer 41 with access to information within the database 40.

In another situation, a conventional telephone 42 or other telephonic device is the remote device manipulated by the user via voice input. The telephone 42 interacts with the telephony frontend server 202 via the PSTN 46 and a service communication interface (such as a telephony line card 45) within the telephony frontend server 203. Data inquiries from the user are processed locally by each frontend server 202–203 in a timely manner using the copied files (i.e., the copied database 210, the copied index 211, and the copied script files 212) along with the IR system modules 26.

Each frontend server 202–203 accesses the backend server 201 in order to make copies of the database 40, the index 37, and the script files 36 from the backend server 201. These copied files (i.e., the copied database 210, the copied index 211, and the copied script files 212) are typically maintained by the frontend servers 202–203 within a memory storage device (not shown) within each frontend server. Each of the frontend servers 202–203 have system memory 206–207 and memory storage devices (not shown) which are used to maintain the copied files and the IR system modules 26. In this manner, each frontend server 202–203 has local access to these copied files and avoids unnecessary traffic across the data network 205 when individually processing data inquiries from users interacting with the frontend servers 202–203. Thus, the frontend servers 202–203 can focus their operation on serving users by utilizing the copied files (i.e., the copied database 210, the copied index 211, and the copied script files 212) along with the IR system modules 26.

As discussed earlier, the preferred embodiment of the present invention is embodied in the IR system modules 26 which are designed to operate in stand-alone and distributed computing systems in conjunction with SunSoft's SOLARIS operating system. However, it should be understood that the invention can be implemented for use with other computer architectures, such as multiprocessing systems. Furthermore, it should be understood that the invention can be implemented for use with other operating systems, such as Microsoft Corporation's "WINDOWS NT" operating system, IBM Corporation's AIX operating system, and Hewlett-Packard's HP-UX operating system or RT-UX operating system.

From this brief description, it should be appreciated that operating systems, such as the "SOLARIS" operating system, and networking architectures are quite complex and provide a wide variety of services that allow users and programs to utilize the resources available in the computer or in other computers in a distributed computing environment. Those skilled in the art will be familiar with operating systems, networking architectures and their various features. Likewise, those skilled in the art will appreciate that the IR system modules 26 provide a wide variety of features and functions in addition to those included in the brief description presented above. Exemplary IR system modules are described below.

Figure 3:
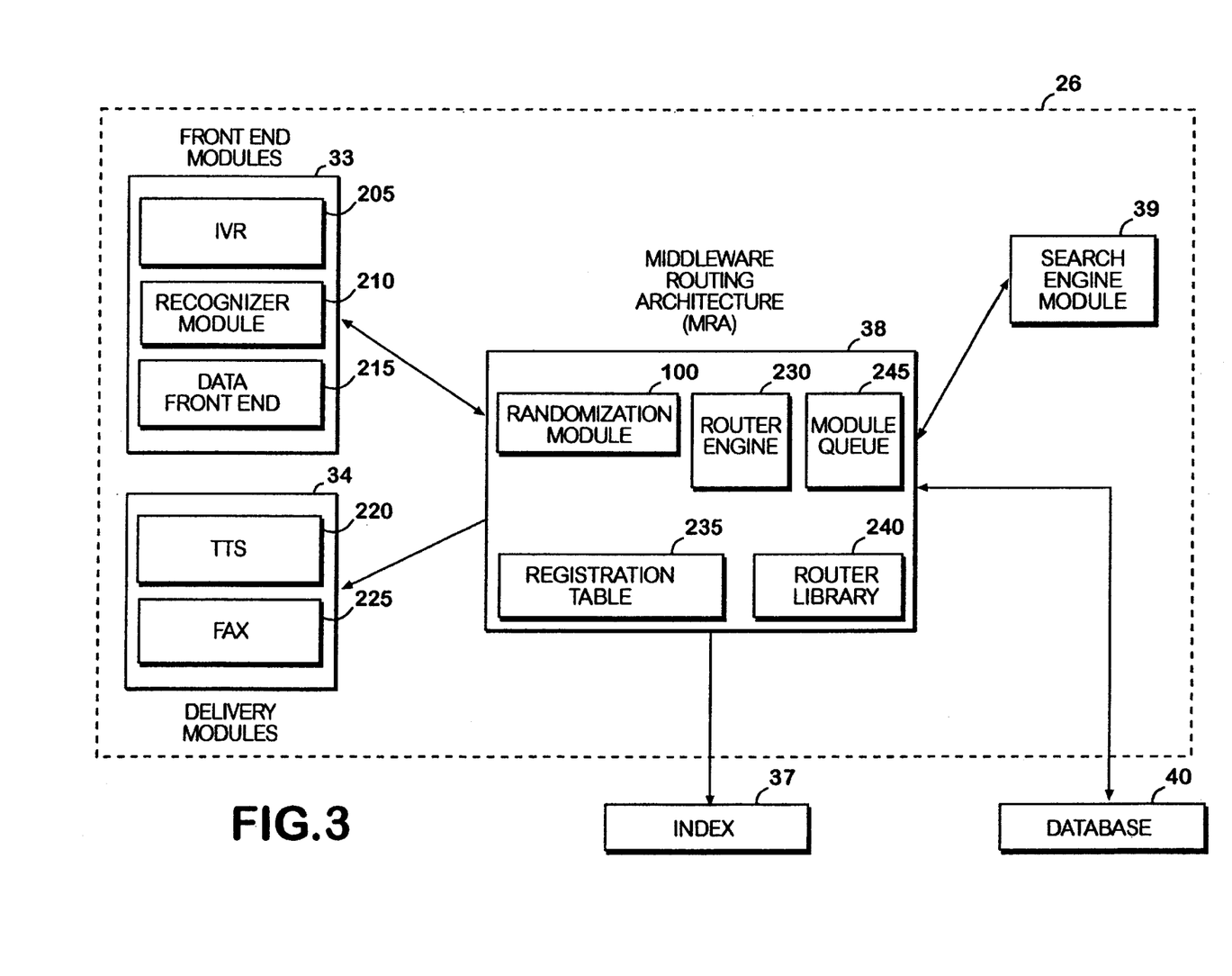
FIG. 3 is a diagram illustrating software components and their operative interrelationships in the exemplary embodiments of the present invention.

Program Modules within the Exemplary IR System—FIG. 3

FIG. 3 is a diagram illustrating the IR system modules 26 and their operative interrelationships in the exemplary embodiments of the present invention. Generally, the IR system modules 26 are used to process a data inquiry. More particularly, a data inquiry may be received through one of the front end modules 33 of the IR system modules 26. These front end modules 33 may include an interactive voice response (IVR) 205, a recognizer module 210, a data front end 215, or other front end module as appropriate. At the appropriate front end module 33, the data inquiry may receive some formatting or other processing prior to being further transmitted to the IR system module referred to as the middleware routing architecture (MRA) 38. The MRA 38 is used to process a data inquiry by adaptively routing the data inquiry from one of the front end modules 33 to the search engine module 39. As illustrated in FIG. 3, the MRA 38 includes a variety of interactive software modules including a router library 240, a router engine 230, a registration table 235, and an exemplary module queue 245. Each of these modules provides connecting or routing services within the IR system 26. The MRA 38 also contains a randomization module 100 as is explained in further detail below.

As noted above, the MRA 38 is used to process a data inquiry by routing the data inquiry to the search engine module 39, which in turn provides the data inquiry to the search engine for a search of the records of the database. After the database has been searched, the search results are returned from the search engine module 39 to the MRA 38 wherein processing of the search results may take place as is described below. This processing may include the arrangement of the records of the search results into ordered records. After this processing of the search results takes place, the search results are generally transmitted from the MRA 38 to the delivery modules 34 of the IR system modules 26. These delivery modules may include a text-to-speech (TTS) module 220, a fax module 225, or other delivery module.

Randomization Module

As noted, after the search results are returned from the search engine module 39, the search results are received in the MRA 38, wherein the records in the search results may be arranged into ordered records. Of course, the search results do not have to be arranged into ordered records. This is a selectable feature and method that may be implemented based on a variety of factors. The processes carried out with respect to the arrangement of records into ordered records are generally carried out in the MRA 38 by the randomization module 100, which is called as necessary or appropriate by the other modules of the MRA 38. Generally, upon receipt of search results in the MRA 38, the router engine 230 may check with or call the randomization module 100 and/or the router library 240 for information or to handle the record arrangement processes. While the randomization module 100 may handle the arrangement processes, the router library 240 may be used by the randomization module 100 (and other modules) to check for information as to whether to arrange the records of any particular set of search results, and further, as to whether to arrange the records into a particular type of ordered records. Additional information regarding these processes is provided in progressively greater detail below.

Pursuant to an exemplary embodiment, after receipt of the search results in the MRA 38, a determination as to whether to arrange the records of the search results into ordered records is made in the MRA 38. This determination is made through the exchange of information necessary for such a determination among the modules of the MRA 38, and in particular, the randomization module 100 and the router library 240. A further determination as to whether to arrange the records into a certain type of ordered records may be made in the MRA 38 as a separate determination or as part of the above-mentioned determination as to whether to arrange the records into ordered records. The determination with respect to the type of ordered records also may be made through the aforementioned information exchange between the randomization module 100 and the router library 240, through an additional information exchange between these elements, or in any other manner as will be known to those skilled in the art. Additional details regarding these determinations and information exchanges are provided below in connection with the examples of the exemplary embodiments.

Further, the determinations as to whether to arrange the records of the search results into ordered records and the type of ordered records for the arrangement may be based on a variety of selectable factors. These factors may include arrangement of records into ordered records based on: (1) an automatic response to the receipt of any search results that the records thereof be arranged into ordered records; (2) the destination of the search results such as the data frontend 215; (3) an association of one or more of the records in the search results with a particular characteristic such as the association of a record with a client or other entity; (4) a status of one or more of the records in the search results as a preferred record; (5) the frequency or number of times that a record or records have appeared in other search results; or (6) a weighting factor assigned to one or more of the records in the search results.

The determinations as to whether to arrange the records of the search results into ordered records and the type of ordered records for the arrangement may be based any one of these aforementioned factors or on a combination of these factors as appropriate. In addition, these determinations may be different and based on different factors with respect to each set of search results received in the MRA 38.

Further, the router library 240 may be provided with information so that the determinations with respect to a set of search results as to whether to arrange the records of the search results into ordered records and the type of ordered records for the arrangement may be carried out based on the selectable factors. Thus, the router library 240 may store, relate and provide information, as appropriate, with respect to records, search results, destinations, frequency scales, weighting factors or status, characteristics or factors of records, search results, clients or other entities. Additional details regarding these determinations and the factors for the basis thereof are provided below in connection with the examples of the exemplary embodiments (FIGS. 5A–5D).

Figure 4:
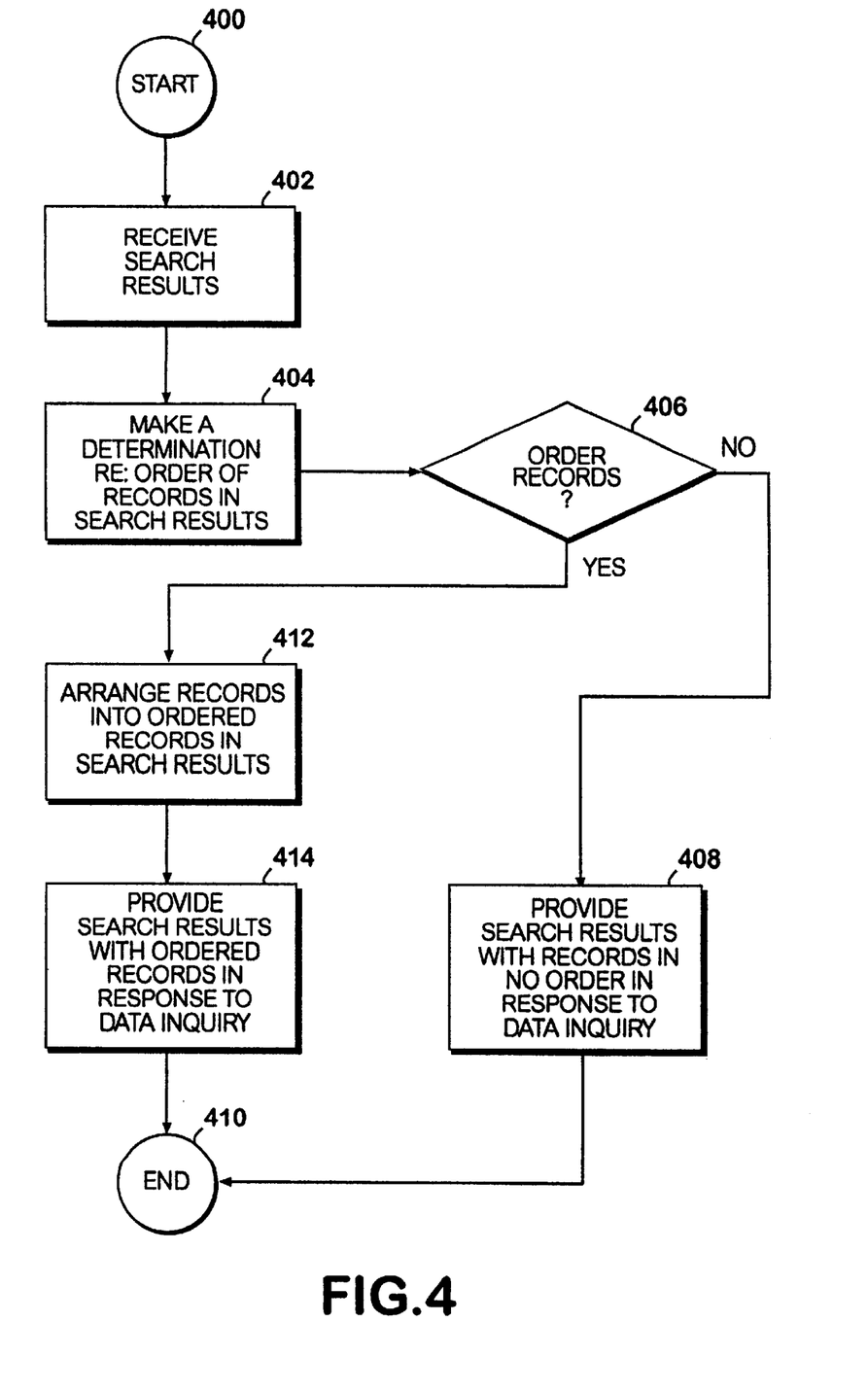
FIG. 4 is a flow diagram illustrating steps of an exemplary method of the present invention.

Summary of Exemplary Method Steps—FIG. 4

FIG. 4 is a flow diagram illustrating an exemplary method of the present invention for the arrangement of the records into ordered records in the search results. The method is entered at start step 400, and proceeds to step 402 wherein search results including records are received. As explained above, generally a set of search results is received in the MRA 38 after a search of a database 40 has been conducted. After the search results are received, then in step 404 a determination is made as to whether to order the records into ordered records. As also explained above, this determination is generally carried out in the MRA 38 through an exchange of information between the appropriate modules such as the router engine, 230, the router library 240 and the randomization module 100. A check is made in step 406 as to whether the determination regarding ordering the records is positive or negative. Additional information regarding this determination step is provided through the examples of exemplary embodiments discussed below in connection with FIGS. 5A–5D. If the determination in step 406 is negative, then in step 408, the method provides the search results with the records in no order in response to the data inquiry. In other words, this branch of the method does not provide for any arrangement of the records into ordered records after receipt of the search results from the database search. The search results with the records in no order are provided generally to the appropriate destination as may be determined by the MRA 38 based on information associated with the search results. Thus, the search results with the records in no order may be provided to any of the delivery modules such as the TTS 220, the FAX 225, or other such module. This branch of the method then ends in step 410.

Still referring to FIG. 4, it was noted above that a check is made in step 406 as to whether the determination regarding ordering the records is positive or negative. If the determination is positive, then in step 412, the records of the search results are arranged into ordered records. The term "ordered records" is used to describe the arrangement of the records of the search results into a set having a particular order for presentation of the records to the user in response to the data inquiry. In the exemplary system, a user is generally presented with the records of the data inquiry in serial fashion so that a particular record is heard, viewed or otherwise received first or before other records of the search results. Additional information regarding this arrangement step is provided through the examples of exemplary embodiments discussed below in connection with FIGS. 5A–5D. After the records are arranged into ordered records in step 412, then in step 414 the search results with the ordered records are provided in response to the data inquiry of the database. Generally, the search results are provided to the appropriate destination as may be determined by the MRA 38 based on information associated with the search results. Thus, the search results with ordered records may be provided to any of the delivery modules such as the TTS 220, the FAX 225, or other such module. This branch of the method then ends in step 410.

Alternative Methods Steps—FIG. 5

As noted in the discussion of the exemplary method illustrated in FIG. 4, after the search results are received, a determination is made as to whether to arrange the records into ordered records. Generally stated, this determination may be an automatic positive determination to arrange records in all search results into ordered records. An automatic determination also may apply with respect to the type of ordered records into which the records are to be arranged. For example, the method may provide that the records of all received search results are to be arranged into ordered records, and that the records of all search results be arranged into a particular type of ordered records. On the other hand, the method may provide that records in all search results be arranged into ordered records, but further provide that the type of ordered records may depend on the particular search results. In other words, by this method, the type of ordered records may vary on a case by case basis. This determination of a type of ordered records may be based on characteristics of the particular set of search results. Thus, the method may provide that the records of all received search results be arranged into ordered records, but that the records of any particular set of search results be arranged into a type of ordered records based on characteristics associated with that particular set of search results.

Alternatively, the determination as to whether to arrange the records of search results into ordered records may be a selectively positive determination in that such a determination is based on characteristics associated with the search results. This selectively positive determination may be made based on one or more of a variety of characteristics or factors of the search results such as the destination of the search results, an association of one or more of the records in the search results with a particular characteristic such as the association of a record with a client or other entity, status of one or more of the records in the search results as a preferred record, the frequency or number of times that a record or records have appeared in other search results, or a weighting factor assigned to one or more of the records in the search results. These characteristics or factors are discussed in greater detail below in connection with the exemplary methods described together with FIGS. 5A–5D.

Further, after a positive determination with respect to arranging the records of a particular set of search results has been made, then a farther determination may be made as to the type of ordered records for the arrangement. This may be an automatic positive determination that follows on a selective positive determination with respect to arranging the records of a particular set of search results into ordered records. In other words, once it has been determined that a particular set of search results is to have ordered records based on some characteristic of the search results (rather than an automatic positive determination), then an automatic selection of the type of ordered records may be made. For example, assume that a particular set of search results is to have ordered records. The method may provide that in all cases that such a determination is positively made, the records then be arranged in a particular type of ordered records.

The method also may provide that the determination as to the type of ordered records for a particular set of search results be made on a case by case basis, rather than be an automatic selection of type of ordered records. This determination as to the type of ordered records may be made based on a variety of characteristics or factors of the search results such as the characteristics and factors mentioned above in connection with the determination as to whether records of search results are to be arranged into ordered records. These characteristics or factors may include the destination of the search results, an association of one or more of the records in the search results with a particular characteristic such as the association of a record with a client or other entity, status of one or more of the records in the search results as a preferred record, the frequency or number of times that a record or records have appeared in other search results, or a weighting factor assigned to one or more of the records in the search results.

Generally, the types of ordered records include: an alphabetical order of records, a preferred order of records based on the preferred status of one or more records over other records, a least frequent first order of records, a most frequency first order of records, a highest weighting factor first order, or a lowest weighting factor first or combinations thereof.

Referring to FIGS. 5A–5D, exemplary embodiments of the present invention are described with respect to the determination steps as to whether records of search results are to be ordered records, and if so, what type or combination of ordered records are to be arranged.

Figure 5A:
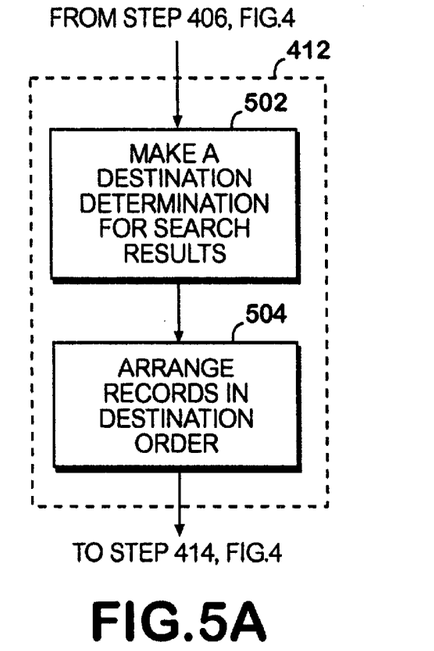

Destination Determination—FIG. 5A

FIG. 5A is a flow diagram illustrating determination steps in the case of a determination made on the basis of the destination of a particular set of search results. The steps of this flow diagram, steps 502 and 504, follow on from step 406 of FIG. 4 ("Order records?"). In step 502, a destination determination is made for the search results, and then in step 504 the records are arranged in destination order. After step 504, the method progresses to step 414 of FIG. 4 ("Provide search results . . . "). In the preferred embodiment, these steps 502, 504 are executed in the MRA 38. Generally, the MRA 38, and in particular, the randomization module 100 and the router library 240 may include information and instructions for the arrangement of records in search results into ordered records based on the destination of the search results. The randomization module 100 may store information relating a possible destination for search results with instructions for the arrangement of records in the search results destined for this destination into ordered records that are arranged in a destination order. The destination order of records may be common to a plurality of destinations, or the destination order may be unique to a particular destination.

As a further illustration of this destination determination example, assume that the search results are destined for a user who is awaiting a response via his or her telephone. In this case, the search results are to be routed from the MRA 38 to the TTS delivery module 220. With the TTS delivery module 220 as the destination of the search results, it may be preferred that the records of the search results be delivered as ordered records rather than non-ordered ("no order") records. Thus, a check by the randomization module 100 results in the determination that the records of these search results be delivered as ordered records, and in particular, that the records be arranged in destination order. This destination order may require that the records be arranged in alphabetical or other order based on some characteristic of the individual records. Alternatively, this destination order may require that additional steps in the method be performed. For example, the records of the search results may need to be checked to determine whether a record of the search results is a preferred record. If so, then the records of the search results may be listed in a preferred order which includes listing a preferred record or records before other records in the search results. As another alternative, this destination order may be a least frequency first (LFF) order as is explained below in connection with FIG. 5C. In that case, the method steps illustrated in FIG. 5A may be followed by the method steps illustrated in FIG. 5C and described below. As yet another alternative, this destination order may be a highest weighting factor first (HWFF) order as is explained below in connection with FIG. 5D. In that case, the method steps illustrated in FIG. 5A may be followed by the method steps illustrated in FIG. 5C and described below.

Figure 5B:
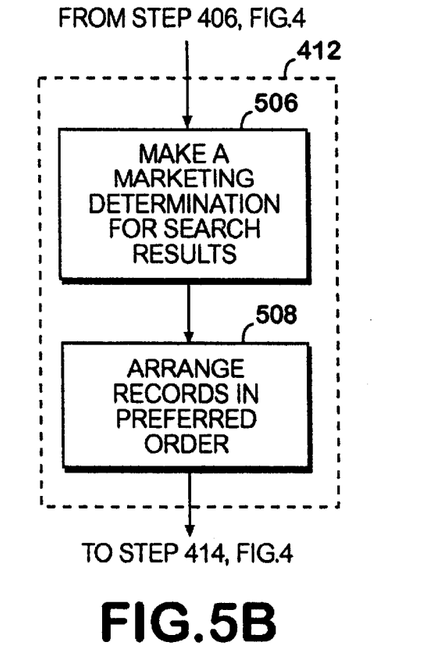

Marketing Determination—FIG. 5B

FIG. 5B is a flow diagram illustrating determination steps in the case of a determination made on the basis of characteristics or factors of records that are referred to herein as marketing characteristics. The steps of this flow diagram, steps 506 and 508, follow on from step 406 of FIG. 4 ("Order records?"). In step 506, a marketing determination is made for the search results, and then in step 508 the records are arranged in a preferred order. After step 508, the method progresses to step 414 of FIG. 4 ("Provide search results . . . "). In the preferred embodiment, these steps 506, 508 are executed in the MRA 38. Generally, the MRA 38, and in particular, the randomization module 100 may include information and instructions for the arrangement of records in search results into ordered records based on the association of one or more of the records with a marketing characteristic or characteristics such as an association of a record with a particular client or with an particular user. The randomization module 100 may store information relating a marketing characteristic of a record or search results with instructions for the arrangement of records in the search results associated with this characteristic into ordered records that are arranged in a preferred order.

The preferred order of records may be common to a plurality of marketing characteristics, or the preferred order may be unique to a particular marketing characteristic. The preferred order may require that the records be arranged in an order whereby one or more records are ordered ahead of other records in the search results. This order may be determined based on the association or lack thereof of the marketing characteristic(s) with one or more of the records. Alternatively, this preferred order may require that additional steps in the method be performed. For example, the records of the search results may need to be checked to determine whether a record of the search results is a preferred record. If so, then the records of the search results may be listed in a preferred order which includes listing a preferred record or records before other records in the search results.

As a further illustration of this marketing determination example, assume that a particular client is a classified advertiser that has paid a premium for the presentation of its information in an advantageous position in search results. In this case, the client definitely prefers that the records of the search results be delivered as ordered records rather than non-ordered records. Moreover, the client prefers that its records be delivered in an advantageous position in the search results. Many clients consider the first record position to be most the advantageous position in the order of records in search results. Thus, this client may specify that its records be associated with a marketing characteristic that results in the records being arranged in advantageous positions in ordered records in search results.

Figure 5C:
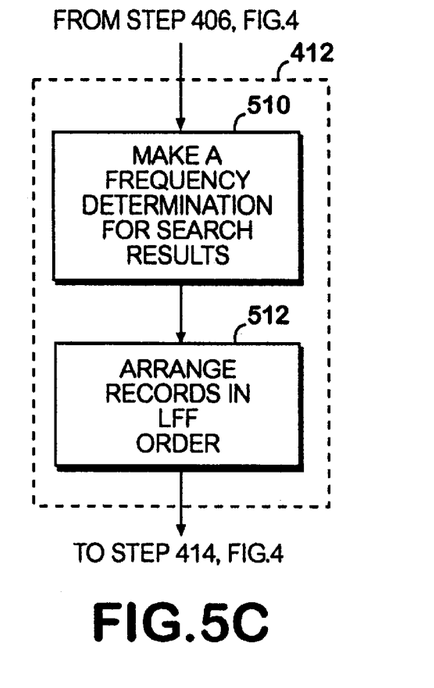

Frequency Determination—FIG. 5C

FIG. 5C is a flow diagram illustrating determination steps made on the basis of frequency characteristics or factors of records. The steps of this flow diagram, steps 510 and 512, follow on from step 406 of FIG. 4 ("Order records?"). In step 510, a frequency determination is made for the search results, and then in step 512 the records are arranged in a least frequency first (LFF) order. After step 512, the method progresses to step 414 of FIG. 4 ("Provide search results . . . "). In the preferred embodiment, these steps 510, 512 are executed in the MRA 38. Generally, the MRA 38, and in particular, the randomization module 100 may include information and instructions for the arrangement of records in search results into ordered records based on the association of one or more of the records with a frequency characteristic or characteristics. These frequency characteristics may include the frequency or number of times that a record or records have appeared in other search results. To execute this frequency determination, the randomization module 100 keep track of the number of times that any particular record is included in search results. The randomization module 100 may store information relating a frequency characteristic of a record or search results with instructions for the arrangement of records in the search results associated with this characteristic into ordered records that are arranged in a least frequent first (LFF) or other order. The LFF order generally provides that the least frequent (LF) record is listed before other records in the search results. The LF record is a record of the search results that has been included in other search results less often than any other record of the search results;

The LFF order of records may be common to a plurality of frequency characteristics, or the preferred order may be unique to a particular frequency characteristic. The LFF order may require that the records be arranged in an order whereby one or more records are ordered ahead of other records in the search results. This order may be determined based on the association or lack thereof of the frequency characteristic(s) with one or more of the records. Alternatively, this preferred order may require that additional steps in the method be performed. For example, the records of the search results may need to be checked to determine whether a record of the search results is an LF record. If so, then the records of the search results may be listed in an LFF order which includes listing an LF record or records before other records in the search results.

Yet additional steps may be performed to order all of the records within a set of search results into ordered records based on the frequency characteristic of each record with respect to each other record in the search results. This frequency characteristic may be thought of as the number that is associated with a record and that reflects the number of times that the record has appeared in other search results. Thus, pursuant to these additional steps, the records may be arranged into ordered records based on the number of times that the records have appeared in other search results. The record with the lowest number or frequency characteristic may be listed first (or most advantageously), the record with the next lowest number or frequency characteristic may be listed second (or second most advantageously), etc.

As a further illustration of this frequency determination example, assume that a particular client is a classified advertiser that has paid a premium for the presentation of its information in an advantageous position in search results. In this case, the client definitely prefers that the records of the search results be delivered as ordered records rather than non-ordered records. Moreover, the client prefers that its records be delivered at least as often as other records and that the client's records hold an advantageous position in the search results. Many clients consider the first record position to be the most advantageous position in the order of records in search results. It is assumed that if the user is satisfied with the first record of the search results, then the user may not review the remainder of the records in the search results. Thus, the client may specify that its records be associated with a frequency characteristic that results in the client's records being arranged in advantageous positions in ordered records in search results.

To further illustrate this frequency example, consider that a particular record may have been provided to a user as part of other search results that had been previously processed through the MRA 38. Because this record had been previously provided in search results, this previously provided record may be arranged in a less advantageous position or order in the search results under processing. By this arrangement, the available records in search results responsive to a particular data inquiry are rotated so that no particular record is provided with a repetitive advantageous position or order.

It will be appreciated that the above described frequency determination ordered the records based on least frequency of appearance of records in other search results. This frequency determination may also be used in an analogous fashion, but based on most frequency of appearance of records in other search results. In other words, a type of ordered records may include records that are ordered such that the most frequently appearing record in other search results appears first in a particular set of search results, the second most frequently appearing record appears second, etc. A most frequent first (MFF) order may be useful in certain contexts such as the delivery of search results with the most popular records listed first or in preferred order over other records. In addition, it is explained above in connection with FIG. 5A that the LFF (or analogous) order methods may be used in connection with the destination order described above.

Figure 5D:
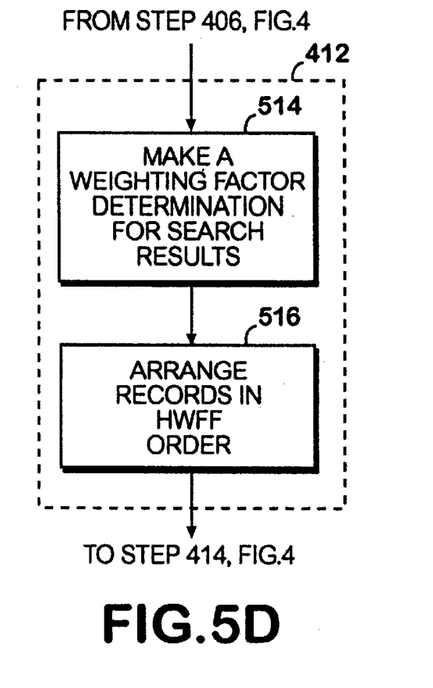

Weighting Factor Determination—FIG. 5D

FIG. 5D is a flow diagram illustrating determination steps in the case of a determination made on the basis of characteristics or factors of records that are referred to herein as weighting factors. The steps of this flow diagram, steps 514 and 516, follow on from step 406 of FIG. 4 ("Order records?"). In step 514, a weighting factor determination is made for the search results, and then in step 516 the records are arranged in a highest weighting factor first (HWFF) order. After step 516, the method progresses to step 414 of FIG. 4 ("Provide search results . . . "). Alternatively, rather than a weighting factor being as ascribed to or determined for each record of the search results, the weighting factor may be ascribed to or determined to only one or a selected number of records.

Referring again to FIG. 5D, in the preferred embodiment, these steps 514, 516 are executed in the MRA 38. Generally, the MRA 38, and in particular, the randomization module 100 and the router library 240 may include information and instructions for the arrangement of records in search results into ordered records based on the association of one or more of the records with a weighting factor or factors. These weighting factors may be based on any feature or element that may serve as the basis of the calculation and ascription of a weighting factor to records such as returned in search results. For example, a weighting factor may be ascribed to or determined for a particular record based on a ratio of the frequency or number of times that the record has appeared in other search results over a time period. The time period may be selected and resetted as appropriate. In this manner, the particular record may be better assured of appearing in an advantageous position in search results more often, on a regular basis, or at least in during a particular time period.

To execute this weighting factor determination, the randomization module 100 may keep track of the weighting factor of any particular record. The randomization module 100 may store information relating a weighting factor of a record or search results with instructions for the arrangement of records in the search results associated with this characteristic into ordered records that are arranged in a highest weighting factor first (HWFF) or other order. The HWFF order generally provides that a highest weighting factor (HWF) record is listed before other records in the search results. The HWF record is a record of the search results that has a higher weighting factor than any other record of the search results.

The HWFF order of records may be common to a plurality of weighting factors, or the preferred order may be unique to a particular weighting factor. The HWFF order may require that the records be arranged in an order whereby one or more records is ordered ahead of or before other records in the search results. This order may be determined based on the association or lack thereof of a weighting factor with one or more of the records. Alternatively, this preferred order may require that additional steps in the method be performed. For example, the records of the search results may need to be checked to determine whether a record of the search results has a highest weighting factor. If so, then the records of the search results may be listed in an HWFF order which includes listing an HWF record or records before other records in the search results.

Yet additional steps may be performed to order all of the records within a set of search results into ordered records based on the weighting factor of each record with respect to each other record in the search results. The record with the highest weighting factor may be listed first (or most advantageously), the record with the next highest weighting factor may be listed second (or second most advantageously), etc.

As a further illustration of this weighting factor determination example, assume that a particular client is a classified advertiser that has paid a premium for the presentation of its information in an advantageous position in search results. In this case, the client definitely prefers that the records of the search results be delivered as ordered records rather than non-ordered records. Moreover, the client prefers that its records be delivered at least as often as other records and that the client's records hold an advantageous position in the search results. Thus, this client's records may be associated with a weighting factor that results in the client's records being arranged in advantageous positions in ordered records in search results.

To further illustrate this example, consider that the records of a set of particular search results are each assigned a weighting factor. Such a weighting factor may be assigned to a record for any number of reasons. For example, a client such as a classified advertiser may have paid a high premium for a high weighting factor assigned to one of its records. Another client may have paid a medium premium for a medium weighting factor assigned to one of its records. By these weighting factors, the record of the client with the high weighting factor may be arranged into a more advantageous position or order in the search results than the record of the client with the medium weighting factor. As a result, the user generally hears or views the record of the client that paid the high premium for the high weighting factor before the user hears or views the record of the client that paid the medium premium for the medium weighting factor.

As another example, a particular weighting factor may be assigned to a particular record based on factors or characteristics associated with the data inquiry that initiated the search of the database and resulted in the search results. For example, a particular weighting factor may be assigned to a particular record based on the time of day of the data inquiry that resulted in the search results. To illustrate this example, assume that statistics demonstrate that short records in search results are preferred by users in response to data inquiries that are initiated in the evenings. Perhaps users have a shorter attention span in the evenings. Thus, a high weighting factor may be assigned to a short record in search results that are returned in response to a data inquiry that was initiated in the evening. Based on the highest weighting factor first order of records, the short record appears in an advantageous position in the search results. The user is satisfied because he or she was provided with search results that took into account the user's preferences for short records. Customer satisfaction is a high priority among service providers of information retrieval systems.

The above described weighting factor determination ordered the records based on highest weighting factor of records in search results. This weighting factor determination also may be used in an analogous fashion but based on lowest weighting factor of records in search results. In other words, a type of ordered records may include records that are ordered such that the record having the lowest weighting factor in the search results appears first in a particular set of search results, the record having the second lowest weighting factor appears second, etc. A lowest weighting factor first (LWFF) order may be useful in certain contexts. In addition, it is explained above in connection with FIG. 5A that the HWFF order method may be used in connection with the destination order described above.

CONCLUSION

Advantageously, the present invention provides several different exemplary methods for arranging records into ordered records to be included in the search results provided in response to a data inquiry of a database. With this variety of methods for arranging records, the service provider benefits by retaining tactical and strategic input with respect to the provision of such search results in response data inquiries. By this invention, the service provider may benefit by being able to provide additional services or features with respect to information retrieval. These additional services or features may provide the service provider with competitive advantages over other service providers of information. In particular, these additional services or features may serve to retain or attract clients as well as users to the service provider.

The exemplary embodiments of the present invention have been described with reference to information retrieval systems, and in particular, with reference to a database of classified advertising information. Nonetheless, the principles of the present invention may be applied to any tasks or processes that retrieve elements of information such as records from whatever source and that transmit these elements of information to users or other entities. As part of these general retrieval and transmission processes, the principles of the present invention may be applied. Accordingly, the scope of the present invention should be defined only by the following claims rather than the foregoing description.

I claim:

1. A method for arranging results of a search of a database, comprising the steps of:

receiving a data inquiry for a database;

in response to the data inquiry, obtaining search results comprising a plurality of records;

determining an ordering characteristic for the search results based on a destination for the search results by identifying a preferred status characteristic associated with the destination and identifying the records of the search results corresponding to the preferred status characteristic;

the ordering characteristic independent from a user input;

arranging the records of the search results into ordered records based on the ordering characteristic; and providing the ordered records to the destination for the search results.

2. A method for arranging results of a search of a database, comprising the steps of:

receiving a data inquiry for the database;

in response to the data inquiry, obtaining search results comprising a plurality of records;

determining an ordering characteristic for the search results based on a destination for the search results by determining a marketing characteristic associated with the destination and applying the marketing characteristic to the search results, the step of applying the marketing characteristic to at least one if the records of the search results further comprising determining whether at least one of the records is associated with a predefined entity;

the ordering characteristic independent of a user input;

arranging the records of the search results into ordered records based on the ordering characteristic; and providing the ordered records to the destination for the search results.

* * * * *